United States Patent [19]

Schirmer

[11] Patent Number: 5,158,831
[45] Date of Patent: Oct. 27, 1992

[54] PLASTIC FILM-METAL FOIL MULTI-LAMINATES

[75] Inventor: Henry G. Schirmer, Spartanburg, S.C.

[73] Assignee: W. R. Grace & Co.-Conn., Duncan, S.C.

[21] Appl. No.: 730,509

[22] Filed: Jul. 11, 1991

Related U.S. Application Data

[63] Continuation of Ser. No. 448,182, Dec. 10, 1989, abandoned.

[51] Int. Cl.$^5$ .............................................. B32B 15/08
[52] U.S. Cl. ..................................... 428/457; 428/461
[58] Field of Search ................. 428/412, 458, 416, 457

[56] References Cited

U.S. PATENT DOCUMENTS

| | | | |
|---|---|---|---|
| 4,211,822 | 7/1980 | Kurfman et al. | 428/412 |
| 4,241,129 | 12/1980 | Marton et al. | 428/216 |
| 4,957,820 | 9/1990 | Heyes et al. | 428/458 X |
| 4,980,210 | 12/1990 | Heyes | 428/359 |

*Primary Examiner*—Thomas J. Herbert, Jr.
*Attorney, Agent, or Firm*—William D. Lee, Jr.; Jennifer L. Skord; Mark B. Quatt

[57] ABSTRACT

A plurality of corona-treated polymeric films, and metal foils or sheets, are alternately arranged and laminated together to form a laminate suitable for e.g. insulating panels. Construction of this absolute or near-absolute barrier can be simultaneous or sequential. The metal foils may be of the same type, or may differ. Aluminum and steel are preferred metal foils. At sufficient thicknesses, the sheet can be stamped or shaped. Both outermost surfaces of the laminate can comprise polymeric film, or both surfaces can comprise metal foils. Alternatively, one outer surface can be a polymeric film and the other outer surface can be a metal foil.

2 Claims, 1 Drawing Sheet

PLASTIC FILM-METAL FOIL MULTI-LAMINATES

This application is a continuation of application Ser. No. 448,182 filed on Dec. 8, 1989, now abandoned.

BACKGROUND OF THE INVENTION

The present invention relates to film/foil laminates, and in particular film/foil laminates wherein a plurality of metal sheets and polymeric films are bonded together.

In the past, various combinations of metallic sheets with non-metallic coatings, substrates and the like have been employed to provide a packaging material, or to alter the inherent properties of metallic sheets.

U.S. Pat. No. 4,211,822 (Kurfman et al) discloses a layer of polystyrene or polycarbonate film metallized with indium or tin/cadmium alloy. This results in reflective and decorative parts for automobiles and other vehicles. The polymer may be pretreated including the use of corona discharge. Materials such as polyvinyl halide or polyvinylidene halide are disclosed as polymers of the polymer layer. The metal layer may be applied to both sides of the polymer layer.

U.S. Pat. No. 4,241,129 (Marton et al) discloses a multilayer metal/organic polymer like that of the Kurfman patent, and including a soft adhesive polymer such as ethylene vinyl acetate copolymer.

U.S. Pat. No. 4,257,536 (Hilmar et al) discloses a laminate structure for dispensing containers having an aluminum layer bonded to a corona treated polyester barrier layer by a polyester or other suitable adhesive layer.

U.S. Pat. No. 4,291,085 (Ito et al) discloses a polypropylene layer which has been corona treated, bonded to a layer of aluminum foil.

U.S. Pat. No. 4,528,234 (Kaiho et al) discloses an aluminum layer bonded to a corona bonded plastic substrate.

U.S. Pat. No. 4,597,818 (Aoyama et al) discloses an aluminum substrate bonded to a corona treated ultra-high molecular weight polyethylene.

U.S. Pat. No. 4,749,625 (Obayashi et al) discloses an amorphous metal with a polymeric coating layer laminated to one surface of the amorphous metal.

U.S. Pat. No. 4,766,035 (Lancaster et al) discloses a metal substrate with a halopolymer adhered thereto.

U.S. Pat. No. 4,855,186 (Grolig et al) discloses a plastic carrier film, a first dielectric layer adhered to the carrier film, and a heat reflection metallic layer adhered to the first dielectric layer.

WO 82/00020 (Nelson-Ashley et al) discloses adhering a linear low density polyethylene film to a sheet metal or foil by engaging the film and sheet metal, heating at least the sheet metal, and applying pressure to the opposed free surfaces. This article may be folded to a pouch.

French Patent Abstract No. FR 2618382-A discloses a packaging material comprising a heat shrinkable plastics material layer adhered to a layer of metallic, preferably aluminum foil. The preferred heat shrinkable layer is polyethylene.

Japanese Patent No. J01027923-A (Mitsui) discloses coextrusion-laminating a resin layer to an oriented film or an aluminum foil through an adhesive layer. The resin may be a polyolefin.

UK Patent Specification 1295132 discloses the pretreatment of one surface of a plastic film by corona discharge; bringing the treated film into contact with a steel sheet at a temperature sufficient to soften the plastic film; and annealing the plastic/metal laminate at or above the melting point of the plastic.

A problem associated with some conventional film-/foil laminate is that it is subject to pin holes and flex cracks. When this occurs, the gas barrier properties of the laminate is degraded, sometimes to such an extent that the laminate loses its utility for the intended end use.

It has now been discovered that by providing a multiplicity of polymeric films and foils laminated together, a laminate is produced which approaches an absolute barrier.

This laminate can be made into for example a vacuum insulating panel by making a pouch, filling it with a separating material (such as a non-woven material or silica), evacuating the pouch and sealing it.

An additional advantage of the present invention is that different metal foils can be combined into a coherent stampable sheet. Therefore metal such as aluminum and steel can be used and built up in thickness to achieve a laminate sheet capable of being stamped or shaped as desired, e.g. beverage cans.

SUMMARY OF THE INVENTION

In one aspect of the invention, a method of making a film/foil laminate comprises passing a plurality of metal sheets and polymeric films toward a pair of press rolls, the metal sheets and polymeric films being arranged in alternating sequence so that each metal sheet is positioned between two films; corona treating each surface of each polymeric film that will subsequently bond to a respective metal sheet; and passing the plurality of metal sheets and treated films between the pair of press rolls.

In another aspect of the invention, a film/foil laminate comprises a plurality of metal sheets and polymeric films arranged in alternating sequence, with polymeric films forming the outermost surfaces of the laminate.

In still another aspect of the invention, a method of making a film/foil laminate comprises passing a plurality of metal sheets and polymeric films toward a pair of press rolls, the metal sheets and polymeric films being arranged in alternating sequence so that each polymeric film is positioned between two metal sheets; corona treating both surfaces of each polymeric film; and passing the plurality of metal sheets and treated films between the pair of press rolls.

In still another aspect of the invention, a film/foil laminate comprises a plurality of metal sheets and polymeric films arranged in alternating sequence, with metal sheets forming the outermost surfaces of the laminate.

In an additional aspect of the invention, a method of making a vacuum insulating panel comprises passing a plurality of metal sheets and polymeric films toward a pair of press rolls, the metal sheets and polymeric films being arranged in alternating sequence so that each metal sheet is positioned between two films; corona treating each surface of each polymeric film that faces a metal sheet; and passing the plurality of the metal sheets and treated films between the pair of press rolls to form a film/foil laminate; making a pouch from the film/foil laminate; placing a insulating material inside the pouch; evacuating the pouch; and sealing the pouch.

In another aspect of the invention, the invention comprises a pouch made from the film/foil laminate with polymeric films forming the outermost surface of the laminate. This pouch may optionally have an insulating material inside the pouch.

The terms "metal foil" and the like, and "metal sheet" and the like, are used herein interchangeably.

BRIEF DESCRIPTION OF THE DRAWING

Referring to the sole drawing figure.

DESCRIPTION OF THE PREFERRED EMBODIMENTS

Figure 1:
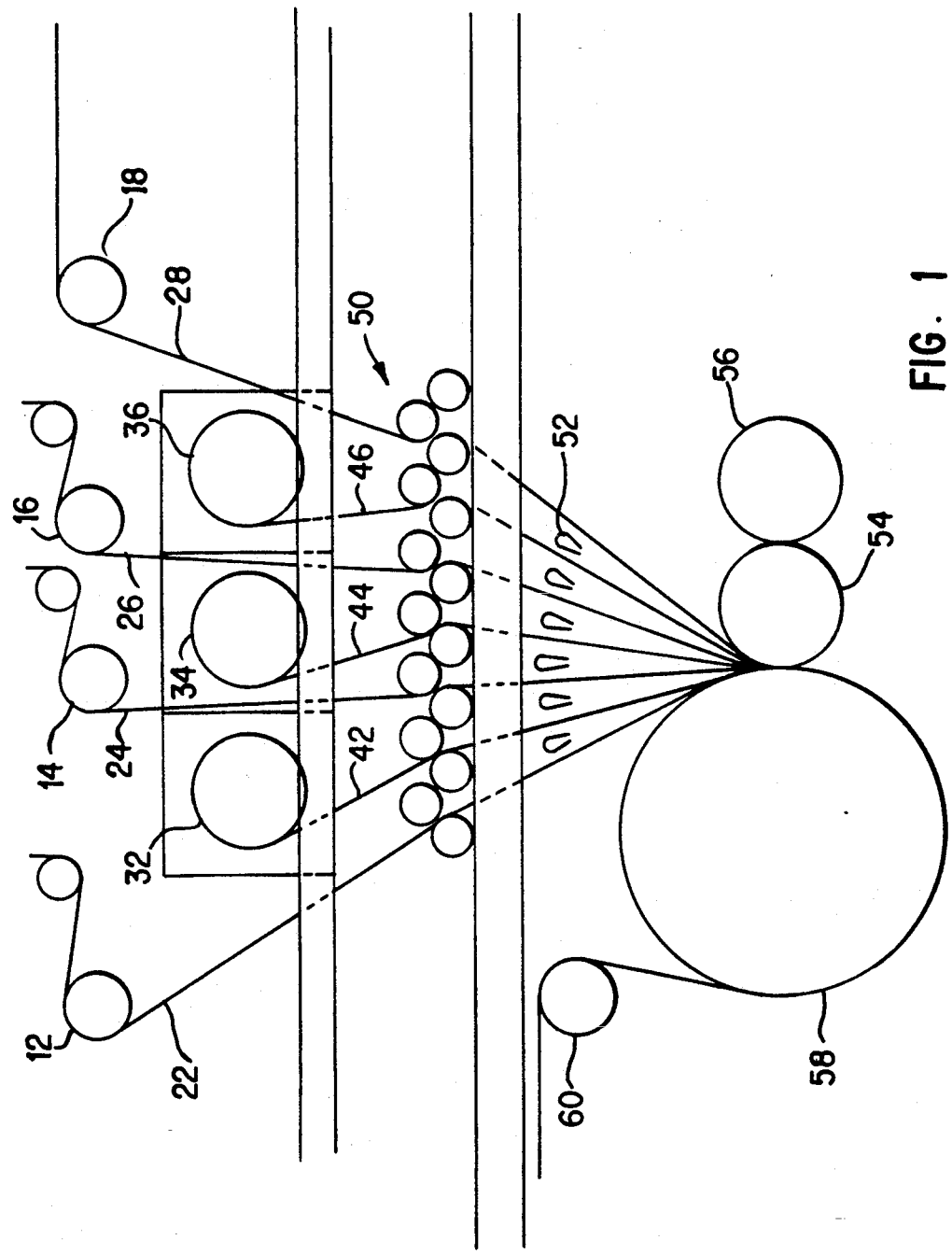
FIG. 1 is a schematic diagram of an apparatus for producing the inventive film/foil multi-laminate.

Referring to the sole drawing figure, several polymeric films and metallic foils are passed through a series of pull rolls and gathered together between a pair of press rolls to form a film/foil multi-laminate of the present invention.

More specifically, film feed rolls 12, 14, 16, and 18 feed respective first film 22, second film 24, third film 26, and fourth film 28 toward press rolls 54 and 58.

These films have previously been corona treated at a conventional corona treating station (not shown) such that first film 22 and fourth film 28 have been corona treated on one interior surface thereof, while second film 24 and third film 26 have been corona treated on both surfaces thereof. By "interior surface" of first film 22 and fourth film 28 is meant that surface of the film which will subsequently come into bonding contact with a metallic foil as described more fully below.

Foil feed rolls 32, 34 and 36 feed respectively first foil 42, second foil 44 and third foil 46 toward press rolls 54 and 58.

The films and foils are gathered together by means of a pull roll array 50 comprising a series of rolls arranged so that, in cooperation with press rolls 54 and 58, the films and foils are brought into communication with each other as shown in the diagram.

The corona treated surfaces of the films come in contact with adjacent foils to help insure an adequate bond within the multi-laminate.

Heating means 52 employs a heating medium such as hot air to preheat the films and foils prior to pressing between press roll 54 and press roll 58. Conventional heating means can be used for this purpose. Preferably, heating roll 56 and press roll 58 are also heated to optimize the bond strength between individual layers of the final multilaminate. Conventional heating means can be used for this purpose.

Roll 60 conveys the final multi-laminate to a wind up roll (not shown).

Polymeric films useful in the present invention are typically thermoplastic and can themselves be of monolayer or multilayer construction, formed by conventional lamination, coextrusion, extrusion coating or other techniques well known in the art. Compositionally, these films may be made up of polyolefinic or other polymeric materials, and may also include polyvinylidene chloride or vinylidene chloride copolymer materials commonly known as saran. Polyethylene and copolymers of ethylene such as ethylene vinyl acetate copolymer, ethylene alpha-olefin copolymer (linear low density polyethylene and very low density polyethylene), and ethylene vinyl acetate copolymer are particularly preferred materials for films 22, 24, 26 and 28.

The foils of the present invention are metallic foils and preferably aluminum. Other materials such as steel can also be used.

Each of the films used in the present invention can be identical, or can differ in composition or construction. Likewise, different metals can be used for the various foils used in producing the multi-laminate.

One advantage of the present invention is that the process and apparatus is flexible enough to accommodate differing metallic foils and differing films.

The invention may be further understood by reference to the following examples.

EXAMPLE 1

A polymeric, multilayer film was prelaminated to an aluminum foil. This lamination was accomplished by corona treating one surface of the polymeric film, and using a metal nip roll at a temperature of about 160° F., and a line speed of about 50 feet per minute, to bond the film to the foil.

This procedure was repeated to produce two rolls of the prelaminated film/foil.

These two rolls of prelaminated film/foil were positioned approximately as shown at rolls 32 and 36 in FIG. 1.

A central feed roll of aluminum foil was positioned between the two rolls of prelaminated film/foil. The relative position of the feed roll of aluminum foil was that represented by feed roll 34 of FIG. 1.

A feed roll of polymeric multilayer film was positioned respectively between the central aluminum feed roll layer and each prelaminated film/foil feed roll. Thus, the two feed rolls of the polymeric multilayer film were positioned as represented by feed rolls 14 and 16 in FIG. 1.

The film from the two film feed rolls was corona treated on both surfaces thereof.

Both of the prelaminated film/foil, the central aluminum foil, and the two multilayer films were drawn through a pull roll array and gathered at press rolls to produce a multi-laminate. A heating roll represented by roll 56 of FIG. 1 was run at a temperature of about 160° F., as was the press roll represented by roll 58 of FIG. 1.

The polymeric film used in the prelaminated film/foil comprised a four layer construction having one outer layer of a linear low density polyethylene (Dowlex 2035) available from Dow Chemical; a second layer of linear low density polyethylene (Dowlex 2045) available from Dow; a third layer of an ethylene vinyl acetate copolymer (Elvax PE-3508) available from du Pont; and a fourth, bonding layer comprising a mixture of 80% of an ethylene vinyl acetate copolymer (Alathon 3180) available from du Pont, blended with 20% antiblocking agent having 90% low density polyethylene and 10% colloidal silica, where the low density polyethylene is Dow PE 722 and the colloidal silica is Syloid 378. The fourth, bonding layer was the layer which was corona treated and bonded to the aluminum foil to produce the prelaminate. The total thickness of each film was about one (1) mil.

All of the foils used in Example 1 were aluminum. Each foil had a thickness of about 0.35 mil.

The polymeric multilayer film fed from intermediate rolls represented by feed rolls 14 and 16 in FIG. 1 comprised a five layer film having outer layers of a blend of 80% of an ethylene vinyl acetate copolymer (Elvax 3182) available from du Pont, blended with 20% of the antiblock agent described above. The central layer of the five layer film was linear low density polyethylene (Dowlex 2045). The intermediate (second and fourth) layers of the multilayer polymeric film were ethylene vinyl acetate copolymer (Elvax PE-3508). The total thickness of each multilayer film was about 0.65 mil.

EXAMPLE 2

A film/foil multilaminate is produced having four discrete polymeric films, and three separate aluminum foil layers disposed between the films in alternating fashion. These polymeric films are corona treated on both sides in the case of films forming an interior layer of the final multilaminate, and on one side in the case of films forming an outer layer of the final multi-laminate, the corona treated side of these latter films being that side which will ultimately be bonded to an aluminum foil surface.

These polymeric films and aluminum foils are drawn through a pull roll array, preheated, and pressed between respective press rolls which are heated. Heating procedures are like those described in Example 1.

EXAMPLE 3

A film/foil multi-laminate is produced substantially as described in Example 1, but having foils of differing metals.

EXAMPLE 4

A film/foil multi-laminate is produced substantially as described in Example 2, but having foils comprising different metals.

EXAMPLE 5

A film/foil laminate is produced substantially as described in Examples 1 or 2, but having a polymeric film as one of the outermost surfaces of the multi-laminate, and a metal foil as the other outermost surface of the multi-laminate.

EXAMPLE 6

A film/foil laminate is produced substantially as described in Examples 1 or 2, but having metal foils as both outermost surfaces of the multi-laminate.

EXAMPLE 7

A pouch is made from any one of the laminates of Examples 1 through 6.

EXAMPLE 8

Any of the pouches of Example 7 is made into an insulating panel by placing an insulating material, such as a non-woven separating material or silica, inside the pouch; evacuating the pouch; and sealing the pouch.

The invention has been described with reference to preferred embodiments and specific examples, but one skilled in the art will appreciate that modifications can be made within the spirit and scope of the claims which follow. For example, any number of polymeric films and metallic foils or sheets can be brought together to produce the film/foil laminate of the present invention. Likewise, the choice of polymeric resins is to a great extent limited only by considerations of cost, desired end use, and the composition of the surface(s) to be corona treated. The surface composition should be such that an adequate bond to an adjacent metallic foil will result, following the method of the present invention. Many metals are suitable for the metallic foil, especially aluminum and steel. The thicknesses of the various films and foils or sheets used in the present invention can differ within a single multi-laminate, and can also differ from one multi-laminate to the next. As an example, film gauges can be as low as 0.1 mil or as high as 10 mil. Foil thicknesses can also range from 0.1 mil to 10 mil. Films used in the present invention can optionally be cross-linked by e.g. irradiation or chemical cross-linking. Irradiation can be done by the use of high energy electrons, ultra violet radiation, X-rays, gamma rays, beta particles, etc.

Many apparatus for irradiating films are known to those of skill in the art. Irradiation is typically carried out at a dosage between about 1 MR and 20 MR.

What is claimed is:

1. A film/foil laminate comprising a plurality of metal sheets and polymeric films arranged in alternating sequence, with a metal sheet forming the outermost surfaces of the laminate; said metal sheets selected from the group consisting of aluminum sheet and steel sheet; and wherein at least one of the polymeric films is a multilayer film.

2. A film/foil laminate comprising a plurality of metal sheets and polymeric films arranged in alternating sequence, so that a polymeric film forms one of the outermost surfaces of the a laminate, and a metal sheet forms another of the outermost surfaces of the laminate; said metal sheets selected from the group consisting of aluminum sheet and steel sheet; and wherein at least one of the polymeric films is a multilayer film.

* * * * *